United States Patent [19]

Booth

[11] 3,939,695

[45] Feb. 24, 1976

[54] APPARATUS FOR DETECTING LEAKS
[75] Inventor: Eugene T. Booth, New York, N.Y.
[73] Assignee: The United States of America as represented by the United States Energy Research and Development Administration, Washington, D.C.
[22] Filed: Feb. 26, 1974
[21] Appl. No.: 12,455

[52] U.S. Cl. ............................................. 73/40.7
[51] Int. Cl.² ........................................ G01M 3/04
[58] Field of Search ................................. 73/27, 40

[56] References Cited
UNITED STATES PATENTS
1,646,247  10/1927  Heinicke ............................... 73/27
2,486,199  10/1949  Nier ....................................... 73/40

Primary Examiner—Samuel Feinberg
Attorney, Agent, or Firm—Dean E. Carlson; Leonard Belkin

ABSTRACT

A method and apparatus for determining the position of and estimating the size of leaks in an evacuating apparatus comprising the use of a testing gas such as helium or hydrogen flowing around said apparatus whereby the testing gas will be drawn in at the site of any leaks.

3 Claims, 1 Drawing Figure

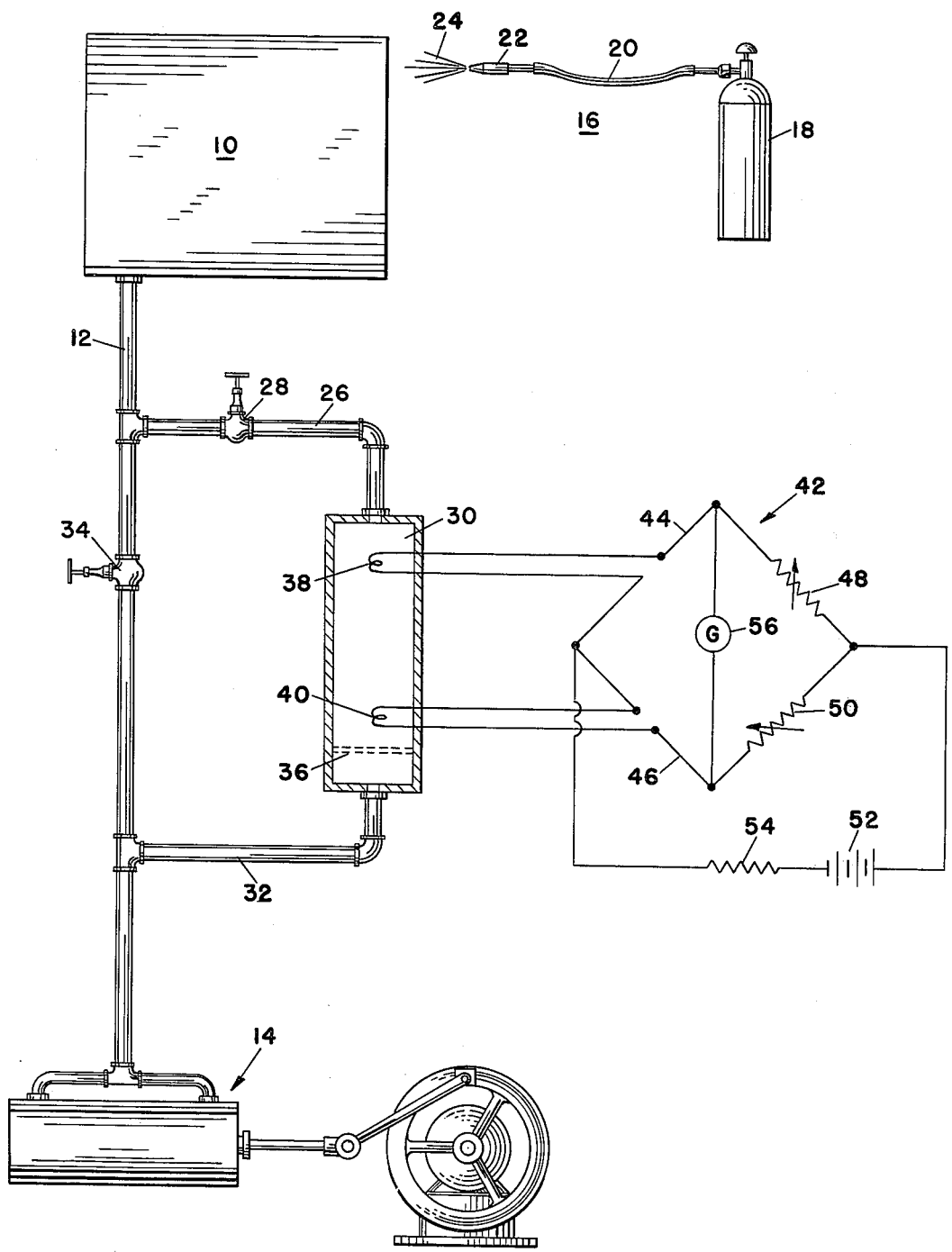
*INVENTOR.*
EUGENE T. BOOTH
BY Roland A. Anderson

APPARATUS FOR DETECTING LEAKS

This invention was made during the course of, or under a contract with, an agency of the United States Government.

This invention relates to leak detection and more particularly to an improved method and apparatus for determining the position of and estimating the size of leaks in an evacuated apparatus.

In recent years there has been a considerable development of the use of high vacuum techniques, particularly in the laboratory, but also to some extent in industry as well. One of the principal problems encountered in the use of high vacua, that is, low absolute pressures, is the problem of eliminating leakage of atmosphere air into the evacuated apparatus in which the low pressure operation is carried out. For an apparatus of a given volumn being continuously evacuated by a pump of given capacity the degree of vacuum attainable is a function of the amount of leakage that occurs, and hence it is important that this leakage be minimized in order that the low pressure operation may be efficiently carried out. Determination of leakage is also important in the manufacture of sealed evacuated containers such as electronic vacuum tubes.

One method that has been extensively used for locating leaks, particularly in industrial vacuum apparatus, involves subjecting the apparatus to internal gas pressure; applying a suitable agent such as a soap solution to the various joints of the apparatus in such manner that the gas leaking out of the apparatus causes bubbles to be formed; and observing the location of the bubbles as an indication of the location of a leak. Although this method has been widely used it is open to a number of objections that limit its usefulness. Thus the method is fairly effective in the case of large leaks but has been found relatively ineffective in locating very small leaks. In some cases the nature of the apparatus may be such that it can not withstand very high pressures and at low pressures small leaks may fail to show up. Also it is possible to have leaks which permit inflow of air too but do not permit outflow of gas from the apparatus. In general, the use of soap solutions is inconvenient, of limited effectiveness, and gives the apparatus an untidy appearance unless the soap solution is removed after use.

Another method that has been proposed for determining leaks involves evacuating the apparatus; scanning the apparatus with a probe comprising a jet of gas having some characteristic that differs from the corresponding characteristic of air, so that when the gas is drawn through a leak it confers the different characteristic on the resulting gas mixture within the apparatus; continuously analyzing the gas mixture from the interior of the apparatus for the different characteristic; and noting the position of the probe when the characteristic of the gas mixture changes to determine the location of a leak. The effectiveness of such a gas probe method of determining leaks depends upon the rapidity and accuracy with which the mixture of gas from the interior of the apparatus can be analyzed. It is evident that a method of continuous analysis is required and that the method used must be rapidly responsive to changes in gas composition so that the probe will not have moved too far from the leak before an indication of the leak is obtained.

Analysis of the gas mixture from the apparatus has heretofore been effected by a mass spectrometer and also by certain electronic devices such as Pirani gauges. However, the mass spectrometer is a relatively complicated and expensive device and also is not well adapted for use in testing large scale industrial equipment wherein the vacua used, while relatively high, are not generally of the order of magnitude at which the mass spectrometer operates effectively. Pirani gauges when used for this purpose are subject to the disadvantage that they are responsive to changes in pressure as well as to changes in gas composition. Hence, in cases where the apparatus is being evacuated by a reciprocating vacuum pump, which causes the pressure to fluctuate, the Pirani gauge does not give an accurate indication of changes in the gas composition.

It is accordingly an object of the present invention to provide an improved method of determining the location and size of leaks in an evacuated apparatus.

It is another object of the invention to provide a gas probe method of determining leakage which produces an accurate indication of the presence of a leak under conditions such that the pressure within the apparatus fluctuates.

It is still another object of the invention to provide a method of determining leaks that may be effectively used on an apparatus being evacuated by a reciprocating vacuum pump.

Other objects of the invention will be in part obvious and in part pointed out hereinafter.

The many objects and advantages of the present invention may best be appreciated and understood by reference to the accompanying drawing which illustrates diagrammatically apparatus capable of being used to carry out a preferred embodiment of the method of the invention. Referring to the drawing the numeral 10 designates an apparatus which is being continuously evacuated through a pipe 12 by the vacuum pump 14. A source of gas 16 for testing the apparatus 10 for leaks is provided comprising a gas storage cylinder 18 from which the testing gas is supplied through a flexible tube 20 to a nozzle 22 to produce a gas jet 24. As indicated above the gas used preferably has an easily measurable characteristic differing from the corresponding characteristic of atmosphere air. For example the gas may be helium or hydrogen which differ markedly from air in their molecular weights.

The surfaces of the apparatus 10 are scanned with the jet 24 and as the jet passes over a leak, helium is drawn through the leak and mixes with the air in the interior of the apparatus. Thus the average molecular weight of the gas within the interior of the apparatus 10 changes and this change in composition is measured by the apparatus now to be described to provide an indication of the presence of a leak.

The pipe 12 interconnecting apparatus 10 and vacuum pump 14 is provided with a by-pass comprising pipe 26 containing shut-off valve 28, testing chamber 30, and pipe 32. The portion of pipe 12 between its connection with pipes 26 and 32 is provided with a shutoff valve 34. During the testing period, shut-off valve 34 is closed and valve 28 opened to cause gas withdrawn from the apparatus 10 by vacuum pump 14 to flow to and through test chamber 30.

Mounted within chamber 30 perpendicular to the path of gas flow there is a porous disk 36 made of a finely porous material through which the gas flows. The pores in the disk 36 are of such small size that a partial separation of the components of the gaseous mixture takes place by diffusion separation and thus the gas upstream of the disk 36 is relatively rich in the heavier components of the gas mixture. The disk 36 may be made of various types of porous materials such as fritted glass and sintered metal powders.

It is evident that when helium is drawn through a leak into the interior of the apparatus and the resulting gas mixture flows through the test chamber 30, the composition of the gas mixture near the entrance of chamber 30 will be different from that immediately upstream of disk 36, in that the gas mixture near the disk 36 will be depleted with respect to helium which is considerably lighter than the principal components of atmospheric air. In accordance with the present method this difference in gas composition is measured by inserting a pair of filaments 38 and 40 in the chamber 30, the filament 38 being located near the entrance of the chamber and the filament 40 being located just upstream of the disk 36. The filaments 38 and 40 are heated and lose heat in proportion to the thermal conductivity of the gas with which they are in contact. Since the thermal conductivity of a gas is a function of its composition the rate of heat loss from filament 38 as compared with the rate of heat loss from filament 40 will reflect the difference in composition of the gases in contact with the two elements.

The rate of heat loss from the filaments 38 and 40 may be determined by measuring the electrical resistance of the elements. For this purpose a conventional Wheatstone bridge 42 is provided and the filaments 38 and 40 are connected in the adjacent arms 44 and 46 of the bridge. Variable resistors 48 and 50 are provided in the other two arms of the bridge. The bridge is energized by the battery 52 in series with resistor 54 and is provided with the usual galvanometer 56 connected thereacross.

The operation of the foregoing apparatus and the manner in which it may be used to carry out the present method should be largely apparent from the above description. When it is desired to test the apparatus 10 for leaks the apparatus is connected to vacuum pump 14, through the test chamber 30, which contains a finely porous disk 36. As atmospheric air from the interior of apparatus 10 flows through the chamber 30 and disk 36 the gas immediately upstream of the disk 36 will be enriched with respect to the heavier component of the gas, that is oxygen. This relatively heavier gas will have a larger thermal conductivity than the air of normal composition surrounding the filament 38 and therefore filament 40 will lose heat more rapidly than filament 38 and its resistance will be lower than that of filament 38. The bridge 42 is initially adjusted by adjustment of variable resistors 48 and 50 to cause the galvanometer 56 to indicate a zero reading with air of natural composition flowing through the chamber 30.

When the bridge 42 has been balanced the outer surfaces of apparatus 10 are scanned with the gas jet 24. When the jet strikes a leak helium is drawn into the apparatus 10, mixes with air in the interior of the apparatus and the resulting mixture passes through the chamber 30. The average molecular weight of the gas passing over both filaments 38 and 40 is reduced but the reduction is greater in the case of the gas in contact with filament 38 and therefore the bridge becomes unbalanced. In other words the galvanometer 56 indicates the change in composition due to helium from the jet 24 passing through the leak. It has been found that the deviation of galvanometer 56 also indicates the approximate magnitude of the leak.

From the foregoing description it is apparent that the present invention provides a simple and effective method of determining the position and relative magnitudes of leaks in an evacuated apparatus. The advantages of the gas probe technique of leak determination are utilized and at the same time a simple and inexpensive method of measuring gas composition is provided. By using the finely porous disk the effect of pressure variations can be largely eliminated.

Since many embodiments might be made of the present invention and since many changes might be made in the embodiment described, it is to be understood that the foregoing description is to be interpreted as illustrative only and not in a limiting sense.

I claim:

1. A device adapted to be used in testing for leaks an apparatus that is being evacuated by a vacuum pump, comprising in combination, a conduit through which gases from said apparatus are drawn by said pump, a finely porous membrane mounted in said conduit to cause gases immediately upstream of said membrane to be enriched with respect to a heavy component of said gases, first thermal conductivity measuring means positioned close to the upstream side of said membrane in contact with said enriched gas, second thermal conductivity measuring means positioned in said conduit at a point sufficiently spaced upstream from said membrane that said second measuring means is in contact with unenriched gas from said apparatus, and indicating means operatively connected to said first and second thermal conductivity measuring means for indicating the relation between said two measuring means as an indication of the presence of a leak in said apparatus.

2. A device adapted to be used in testing for leaks apparatus that is being evacuated by a vacuum pump, said device comprising in combination with said apparatus and vacuum pump a conduit interconnecting said apparatus and pump through which gases are drawn from said apparatus by said pump, a finely porous membrane mounted in said conduit to cause the gas adjacent the upstream face of said membrane to be enriched with respect to a heavy component of said gas, first thermal conductivity measuring means positioned adjacent the upstream face of said membrane in contact with said enriched gas, second thermal conductivity measuring means positioned in said conduit at a point sufficiently spaced upstream from said first measuring means that said second measuring means is in contact with unenriched gas from said apparatus, a probe, means for supplying to said probe a gas having diffusive characteristics different from those of air whereby said probe may be used to scan said leaks and said testing gas will be drawn through any leaks to vary the relationship between said first and second conductivity measuring means, and indicating means operatively associated with said first and second measuring means for indicating a change in the relation therebetween as an indication of the location of said leak.

3. A device adapted to be used in testing for leaks apparatus that is being evacuated by a vacuum pump, comprising in combination with said apparatus and pump, a conduit interconnecting said apparatus and pump through which gases are drawn from said apparatus by said pump, a finely porous membrane mounted across said conduit to cause gases immediately upstream of said membrane to be enriched with respect to a heavy component of said gases, a first electrical resistance element positioned adjacent to said membrane in contact with said enriched gas, a second electrical resistance element spaced upstream from said first element and in contact with unenriched gas flowing from said apparatus, means for supplying electrical energy to said first and second elements to heat said elements, whereby the temperature of said elements and consequently their resistances vary as a function of the thermal conductivity of the gases in contact therewith, electrical resistance measuring apparatus for measuring and comparing the resistances of said first and second elements, said measuring apparatus including indicating means for indicating changes in the relation between the resistances of said first and second element to indicate leaks in said apparatus.

* * * * *